US008385403B2

(12) United States Patent
Shirota et al.

(10) Patent No.: US 8,385,403 B2
(45) Date of Patent: Feb. 26, 2013

(54) DIGITAL BROADCASTING RECEIVING UNIT AND DIGITAL BROADCASTING SYSTEM

(75) Inventors: Hiroshi Shirota, Tokyo (JP); Tadashi Saito, Tokyo (JP); Kazuyuki Ito, Tokyo (JP); Ryosuke Okuda, Tokyo (JP); Masao Aramoto, Tokyo (JP)

(73) Assignee: Renesas Electronics Corporation, Kawasaki-Shi, Kanagawa (JP)

( * ) Notice: Subject to any disclaimer, the term of this patent is extended or adjusted under 35 U.S.C. 154(b) by 1454 days.

(21) Appl. No.: 11/785,406

(22) Filed: Apr. 17, 2007

(65) Prior Publication Data

US 2007/0253493 A1 Nov. 1, 2007

(30) Foreign Application Priority Data

Apr. 26, 2006 (JP) .................................. 2006-121877

(51) Int. Cl.
*H04N 7/12* (2006.01)
(52) U.S. Cl. ............. 375/240; 380/211; 725/1; 455/323
(58) Field of Classification Search .................. 375/240, 375/362; 725/1; 455/323
See application file for complete search history.

(56) References Cited

U.S. PATENT DOCUMENTS

| 6,594,330 | B1 | 7/2003 | Wilson | |
|---|---|---|---|---|
| 7,953,223 | B1* | 5/2011 | Harvey et al. | 380/211 |
| 2003/0114130 | A1* | 6/2003 | Morishige | 455/323 |
| 2006/0233292 | A1* | 10/2006 | Miura | 375/362 |
| 2007/0089123 | A1* | 4/2007 | Park | 725/1 |

FOREIGN PATENT DOCUMENTS

JP 2001-177407 A 6/2001

OTHER PUBLICATIONS

International Standard, "Information technology—Generic coding of moving pictures and associated audio information: Systems", Reference No. ISO/IEC 13818-1, Second Edition Dec. 1, 2000, pp. 1-174.
Japanese Office Action of Aug. 2, 2011 in corresponding Japanese Patent Application JP2006-121877 (includes partial English translation).

* cited by examiner

*Primary Examiner* — Nathan Flynn
*Assistant Examiner* — Phuoc Tran
(74) *Attorney, Agent, or Firm* — Buchanan Ingersoll & Rooney PC (57) ABSTRACT

This invention provides a digital broadcasting receiving unit capable of achieving synchronization of time information between a base station and a receiving unit with reference clock without use of a crystal oscillator (VCXO) having a variable frequency. The crystal oscillator oscillates a clock of a predetermined fixed frequency. A variable digital dividing circuit divides a fixed frequency by a division ratio so as to change the division ratio. A system decoder detects reference time information from the base station. A reference counter generates time information of a receiving unit. A phase comparator detects a difference between reference time information and time information. A division ratio control circuit controls the change of the division ratio based on the difference. The reference counter generates time information based on a clock having a frequency obtained by dividing by the variable digital dividing circuit and feeds back time information to the phase comparator.

6 Claims, 7 Drawing Sheets

DIGITAL BROADCASTING RECEIVING UNIT AND DIGITAL BROADCASTING SYSTEM

BACKGROUND OF THE INVENTION

1. Field of the Invention

The present invention relates to a digital broadcasting receiving unit and a digital broadcasting system.

2. Description of the Background Art

Conventionally, a digital broadcasting receiving unit (hereinafter referred to as receiving unit) for home use has been so constructed that a base station and the receiving unit are operated according to a common clock and time information by accurately synchronizing the reference clock of the base station (broadcasting station) with the reference clock of the receiving unit at home. This method has been described in MPEG2 standard (ISO_IEC_13818-1, Appendix D).

This receiving unit utilizes an expensive crystal oscillator having a variable frequency (hereinafter referred to as VCXO) in order to accurately synchronize the reference clock of the base station with the reference clock of the receiving unit. The operation of the receiving unit having the VCXO will be briefly described as follows.

First, a difference between time stamp information (PCR: program clock reference or SCR: system clock reference) sent from the base station and time information (STC: system time clock) counted by the reference clock (for example, 27 MHz, which is generated by the VCXO) of the receiving unit side is detected. Then, the frequency of the VCXO is controlled using that difference. Here, the receiving unit constitutes a feedback system for time information error and a phase synchronous loop is realized.

The frequency of broadcasting the time stamp information from the base station is very low or may be irregular. The time stamp information may be lost under bad receiving condition. For example, the frequency of broadcasting the time stamp information is about once per 100 ms. Assuming that the frequency of the reference clock of the receiving unit side is 27 MHz, the time stamp information is broadcast only once every about 2,700,000 clock cycles and the reference clock of the receiving unit side needs to be synchronized with the reference clock of the base station according to difference information at this time. When the time stamp information is lost, the frequency of detection of the difference information is lowered further.

On the other hand, because color shift of an image, noise, noise of sound or the like is generated easily when the frequency deflection of the receiving unit side clock is large, the frequency deflection of the receiving unit side clock needs to be kept as small as possible. For the reason above, the frequency needs to be controllable in order to generate the reference clock on the receiving unit side and a clock oscillation circuit having a high frequency accuracy and a high stability is necessary. Conventionally, the VCXO is used in such a clock oscillation circuit.

In the meantime, the reference clock of the base station and the reference clock (generated by the VCXO as described above) on the receiving unit side after synchronization is, for example, 27 MHz.

As described above, in the conventional receiving unit, the expensive VCXO is an indispensable component, which causes a rise of the price of the receiving unit.

For the reason of physical composition, the VCXO cannot be incorporated in a decoder LSI and such an external component as a low-pass filter is also indispensable. Consequently, this not only causes a rise of part cost but also induces a trouble.

SUMMARY OF THE INVENTION

An object of the present invention is to provide a digital broadcasting receiving unit capable of, without using a crystal oscillator having a variable frequency (VCXO), suppressing generation of fault and achieving synchronization of time information between a base station and a receiving unit with a reference clock.

According to the present invention, the digital broadcasting receiving unit can receive digital broadcasting sent from a base station, and includes a fixed frequency oscillating portion, a variable digital dividing portion, a reference time information detecting portion, a time information generating portion, a difference detecting portion, and a division ratio control portion. The fixed frequency oscillating portion oscillates a clock of a predetermined fixed frequency. The variable digital dividing portion divides digitally the fixed frequency by a division ratio so as to change said division ratio. The reference time information detecting portion detects reference time information which is sent from the base station and is information concerning base station side reference clock which serves as a criterion in the base station. The time information generating portion generates time information which is information concerning receiving unit side reference clock which serves as a criterion in the digital broadcasting receiving unit. The difference detecting portion detects a difference between the frequency of the base station side reference clock and the frequency of the receiving unit side reference clock from the reference time information and the time information. The division ratio control portion controls a change of the division ratio based on the difference. The time information generating portion generates the time information based on a clock having a frequency divided digitally by the variable digital dividing portion and feeds back the time information to the difference detecting portion.

Consequently, the clock variable in the frequency can be generated at a high frequency accuracy and with a high stability by only a digital circuit without using the VCXO. Thus, the expensive VCXO and analog circuit components can be reduced. As a result, manufacturing cost of the receiving unit can be reduced. Further, any analog circuit is not necessary thereby leading to reduction of failure rate.

These and other objects, features, aspects and advantages of the present invention will become more apparent from the following detailed description of the present invention when taken in conjunction with the accompanying drawings.

DESCRIPTION OF THE PREFERRED EMBODIMENTS

As described previously, the digital broadcasting system is constituted of a base station (broadcasting station) which sends digital broadcasting and a digital broadcasting receiving unit (hereinafter referred to as receiving unit) for home use. Here, at least one receiving unit is provided, which receives digital broadcasting sent from the base station and outputs that digital broadcasting.

Hereinafter, the present invention (in particular, the receiving unit) will be described in detail with reference to drawings illustrating the embodiments.

First Embodiment

Figure 1:
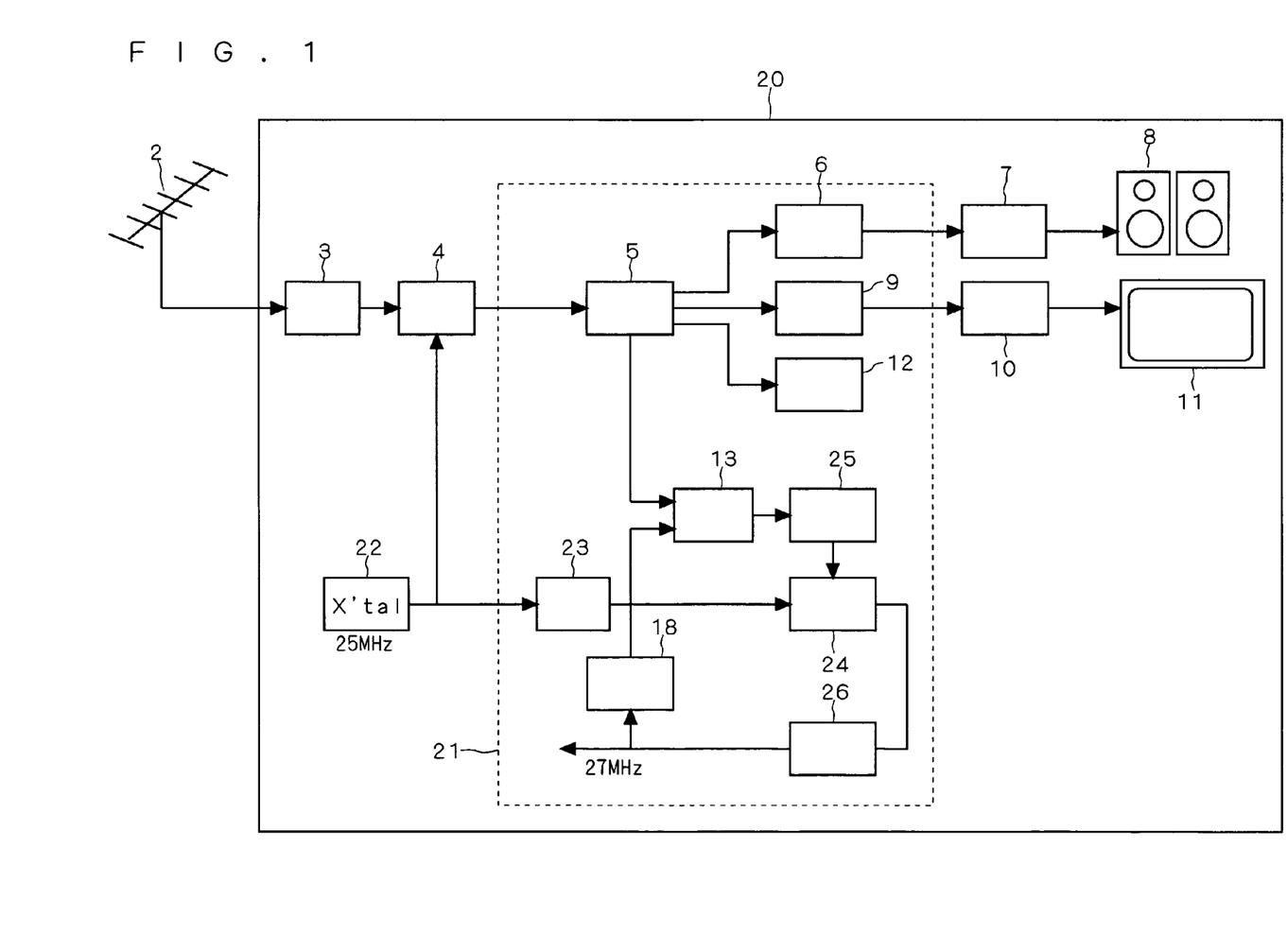
FIG. 1 is a block diagram showing a structure of a digital broadcasting receiving unit according to a first embodiment.

FIG. 1 is a block diagram showing the structure of a receiving unit 20 according to this embodiment.

As shown in FIG. 1, the receiving unit 20 comprises an antenna 2, a tuner 3, a demodulator 4, a digital analog (DA) converter 7, a speaker 8, a display circuit 10, a display device 11 (for example, liquid crystal panel), a decoder LSI (large scale integration) 21, and a crystal oscillator (which can be grasped as fixed frequency oscillator) 22.

The decoder LSI 21 comprises a system decoder (which can be grasped as reference time information detecting portion) 5, an audio decoder 6, a video decoder 9, a control CPU (central processing unit) 12, a phase comparator (which can be grasped as a difference detector) 13, a reference counter (can be grasped as a time information generating portion) 18, a multiplier 23, a variable digital dividing circuit (which can be grasped as a variable digital dividing portion) 24, a division ratio control circuit (which can be grasped as a division ration controlling portion) 25, and a dividing circuit 26.

The receiving unit shown 20 in FIG. 1 receives electric wave of digital broadcasting (for example, terrestrial broadcasting) sent from a base station (not shown) through its antenna 2. From the received electric wave, a desired channel is selected by means of a tuner 3. The demodulator 4 converts the selected received signal to digital bit-stream (called transport stream (TS)) and inputs the TS signal into the decoder LSI 21.

Here, the demodulator 4 inputs a clock of for example, 25 MHz necessary for demodulation from the crystal oscillator 22 which oscillates clock having a predetermined fixed frequency.

In the decoder LSI 21, the system decoder 5 separates the TS signal to audio stream signal, video stream signal, and various control signals (service information: SI). Then, the system decoder 5 sends the above-mentioned signals to the audio decoder 6, the video decoder 9 and the control CPU 12.

The audio decoder 6 decodes audio signal and the decoded audio signal is outputted to the speaker 8 through the DA converter 7. The video decoder 9 decodes video signal and the decoded video signal is displayed on the display device 11 (for example, liquid crystal display panel) through the display circuit 10.

The control CPU 12 collects various control signals except the video signal and audio signal and controls the entire digital broadcasting receiving unit 20. The time stamp information (progress clock reference (PCR) or system clock reference (SCR) and which can be grasped as reference time information) is buried in the control signal.

In the meantime, the time stamp information (reference time information) is information concerning base station side reference clock which serves as the criterion on the base station.

If the time stamp information sent from the base station is detected by the system decoder 5, the system decoder 5 sends the time stamp information to an input portion on one side of the phase comparator 13. Then, time information (system time clock(STC)) on the side of the receiving unit 20 is received by an input portion on the other side of the phase comparator 13.

The time information mentioned here means information concerning the receiving unit side reference clock which serves as the criterion of the digital broadcasting receiving unit 20.

The phase comparator 13 detects a difference (phase error) between the frequency of the base station side reference clock and the frequency of the receiving unit side reference clock from the time stamp information and the time information when the time stamp information is received. After that, the phase comparator 13 sends information concerning the difference to the division ratio control circuit 25.

By the way, as mentioned, the crystal oscillator 22 oscillates a clock of a fixed frequency of for example, 25 MHz and the fixed frequency is used as the reference clock for processing of the modulator 4. Further, a clock of 25 MHz from the crystal oscillator 22 is inputted into the multiplier (which can be adopted in phase locked loop (PLL)) 23 also.

The multiplier 23 multiplies the inputted clock of 25 MHz by 52 so as to generate a clock of 1.3 GHz. As the frequency of the clock after multiplied is increased, the digital division rate becomes narrower so that an error which can be generated in division processing in the variable digital dividing circuit 24 can be reduced. Therefore, although the frequency of the clock after the multiplication is demanded to be as high as possible, 1.3 GHz is used in this description considering the processing velocity within the decoder LSI 21.

After receiving a clock of 1.3 GHz after multiplication from the multiplier 23, the variable digital dividing circuit 24 divides the clock of 1.3 GHz so as to generate a clock changed minutely with respect to 216 MHz (changing the frequency outputted from the digital dividing circuit 24 minutely). That is, the variable digital dividing circuit 24 can divide a frequency based on the fixed frequency according to a variable division ratio. In the meantime, the deflection of the frequency outputted from the variable digital dividing circuit 24 is, for example, about ±100 PPM.

The division ratio of the variable digital dividing circuit 24 is changed by control by the division ratio control circuit 25. The division ratio control circuit 25 controls the change of the division ratio based on information concerning the difference received from the phase comparator 13.

The clock of 216 MHz divided variably as described above is sent to the dividing circuit 26. The dividing circuit 26 divides a clock of 216 MHz by 8 so as to generate a receiving unit side reference clock of 27 MHz (reference clock on the decoder LSI 21). Then, the receiving unit side reference clock of 27 MHz is sent to the reference counter 18.

The reference counter 18 is a circuit for generating the time information in the receiving unit 20. More specifically, the reference counter 18 advances the count using the inputted receiving unit side reference clock of 27 MHz so as to calculate (generate) time information which serves for the criterion for the receiving unit 20.

As evident from the above structure, the reference counter 18 generates the time information based on a clock having a frequency obtained by the variable division by the variable digital dividing circuit 24. The generated time information is fed back to the phase comparator 13.

In the above structure, the division ratio control circuit 25 controls the change of the division ratio so that the frequency of a clock outputted from the variable digital dividing circuit 24 is decreased (the clock is retarded) if the frequency of the receiving unit side reference clock is larger (faster) than the frequency of the base station side reference clock and that the frequency of a clock outputted from the variable digital dividing circuit 24 is increased (the clock is accelerated) if the frequency of the receiving unit side reference clock is smaller (slower) than the frequency of the base station side reference clock (this control is called negative feedback).

Next, the variable operation of the division ratio will be described with reference to a detailed structure diagram (FIG. 2) of the variable digital dividing circuit 24.

Figure 2:
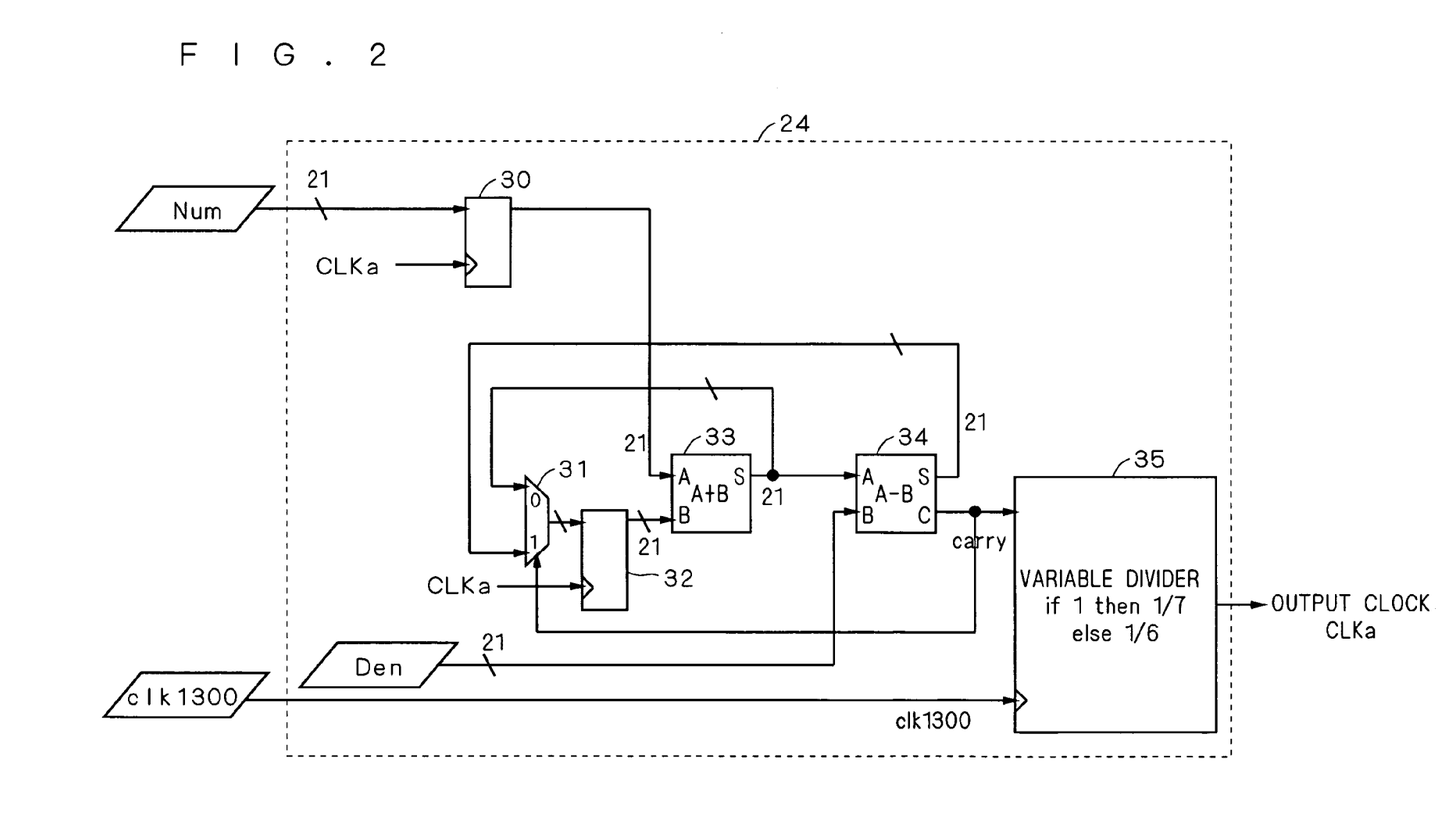
FIG. 2 is a block diagram showing an internal structure of a variable digital dividing circuit according to the first embodiment.

As shown in FIG. 2, the variable digital dividing-circuit 24 comprises registers 30, 32, a selector 31, an adder 33, a subtractor 34, and a variable divider (hereinafter referred to as just divider) 35.

A Num value (which can be grasped as a first number) is a variable value and a signal which is inputted from the division ratio control circuit 25 into the variable digital dividing circuit 24. A change of the Num value is controlled based on the difference information by the division ratio control circuit 25.

The variable digital dividing circuit 24 has a Den value (which can be grasped as a third number). The Den value mentioned here is a fixed value. The Den value may be inputted from out of the variable digital dividing circuit 24.

A clock of 1.3 GHz (hereinafter referred to as clk1300) multiplied by the multiplier 23 is inputted to the variable digital dividing circuit 24.

As shown in FIG. 2, the output clock CLKa produced by dividing based on a variable division ratio is outputted from the variable digital dividing circuit 24. The output clock CLKa is inputted to an input portion of the register 30 and an input portion of the register 32.

In FIG. 2, the Num value is inputted to the other input portion of the register 30. The Num value is sent to an "A" input portion of the adder 33 synchronously with the output clock CLKa. The register 32 outputs a register value (which can be grasped as a second number) v1 possessed by the register 32 to a "B" input portion of the adder 33 synchronously with the output clock CLKa.

The adder 33 which receives the Num value and the register value v1 adds the Num value to the register value v1. The adder 33 outputs a signal produced by that addition (called addition signal) from the "S" output portion. Then, that addition signal is sent to the "A" input portion of the subtractor 34 and the "0" input portion of the selector 31.

The Den value is inputted to the "B" input portion of the subtractor 34. The subtractor 34 compares the addition signal with the Den value and calculates to obtain a difference. After that, the subtractor 34 outputs a difference signal which is a result of the difference between the addition value and the Den value from the "S" output portion. In the meantime, the difference signal is inputted to the "1" input portion of the selector 31.

If the value of the addition signal is not larger than the Den value, the subtractor 34 sends the "0" signal from the "C" output portion to the selector 31. Contrary to this if the value of the addition signal is larger than the Den value, the subtractor 34 sends the "1" signal from the "C" output portion to the selector 31. That "0" signal and "1" signal can grasp a carry signal (carry).

The selector 31 outputs the addition signal or the subtraction signal based on the aforementioned carry signal. If the carry signal is "0" signal, the selector 31 outputs the addition signal to the register 32. If the carry signal is "1" signal, the selector 31 outputs the subtraction signal to the register 32.

The register 32 holds a signal sent from the selector 31 as a next register value (which can be grasped as a second number). Then, the register 32 sends the next register value v2 to the "B" input portion of the adder 33 synchronously with the output clock CLKa. In the meantime, in the operation of each circuit 30-34, the same operation as described above is repeated.

The carry signal sent from the "C" output portion of the subtractor 34 is inputted to the divider 35 also. The divider 35 receives the clk1300 multiplied by the multiplier 23 in other output portions.

After receiving the carry signal and clk1300, the divider 35 divides the clk1300 with a predetermined positive number if the carry signal is "0" signal (if the addition signal is not larger than the Den value). Contrary to this, if the carry signal is "1" signal (if the addition signal is larger than the Den value), it divides the clk1300 with a number obtained by changing the predetermined positive number by the amount of an integer. Then, the divider 35 outputs a clock after division as output clock CLKa.

Hereinafter, the operation of the divider 35 will be described with a specific numeric value. Assume that the clk1300 (1.3 GHz) is multiplied by the multiplier 23 and that the frequency after division in the variable digital dividing circuit 24 is 216 MHz.

The division ratio is expressed by division ratio=6+Num value/Den value. Therefore, the division ration between 1.3 GHz and 216 MHz is 6+1/54 (=6.0185185.). Assume that the accuracy of internal processing is set on binary 21 digits. Then, more specifically, arithmetic operation is carried out with Num value=32768 and Den value=1769472.

Although the Den value is a fixed value as described above, the Num value is a variable value which is increased/decreased according to an instruction of the division ratio control circuit 25. If the Num value is changed by −1, the output frequency is changed to about 216000020 Hz so that the frequency is increased by about 0.1 PPM.

Figure 3:
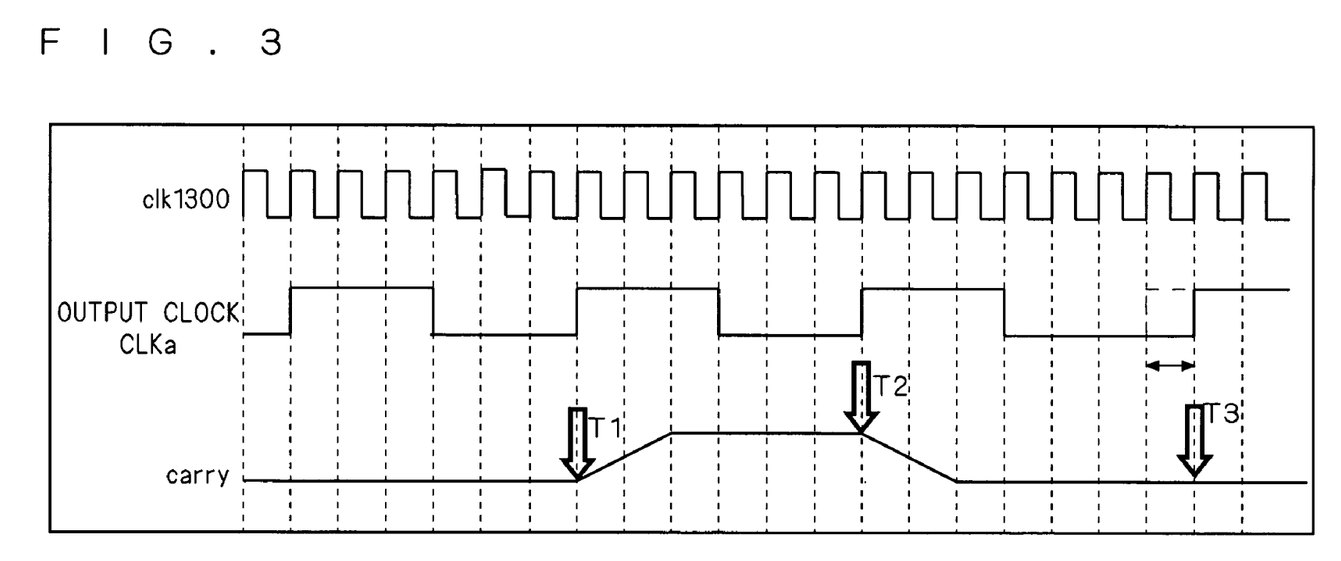
FIG. 3 is a timing chart for explaining an operation of the variable digital division in the first embodiment.

Usually (in case where the carry signal is "0" signal), the divider 35 divides an input signal of 1.3 GHz (clk1300 in the same Figure) by 6. However, only if the carry signal of the "1" signal is outputted from the subtractor 34, the divider divides by 7. FIG. 3 is a timing chart showing an example of an operation at that time.

At timing T1, the value of the addition signal is not larger than the Den value and the carry signal is the "0" signal. At timing T2, the value of the addition signal becomes larger than the Den value and the carry signal turns to the "1" signal. Corresponding to the carry signal which is the "1" signal, the divider 35 changes the division ratio to 7. That is, a period between T2 and T3 turns to an amount similar to 7 cycles of the clk1300. At timing T3, the value of the addition signal is decreased by only the Den value and the carry signal is restored to the "0" signal while the division ratio turns to 6. Consequently, output clock CLKa of 216 MHz is outputted from the divider 35.

In FIG. 3, the carry signal is changing smoothly, which indicates a delay of signal.

In this way, a ratio between the input frequency (1.3 GHz) and the output frequency (216 MHz) is calculated with an error. Therefore, the graduation of clock on time axis is each 0.77 nano second which is an inverse number of 1.3 GHz, and the clock of a specified frequency can be generated accurately.

By increasing/decreasing the Num value from −1000 to +1000, fine adjustment of the output clock CLKa (consequently, receiving unit side reference clock) can be achieved from −100 PPM to +100 PPM by the unit of 0.1 PPM.

Unless the time stamp information is received, the Num value is held without any change. Unless the Num value is changed, the frequency accuracy and stability of the receiving unit side clock are substantially equal to the crystal oscillator 22, thereby indicating a high frequency accuracy and a high stability. The reason is that the receiving unit side clock is generated by dividing the output clock of the crystal oscillator 22 digitally.

As described above, the digital broadcasting receiving apparatus 20 of this embodiment divides a clock having a fixed frequency oscillated from the crystal oscillator 22 digitally, so that a receiving unit side reference clock of 27 MHz is generated and the division ratio is adjusted finely corresponding to a comparison between the time stamp information (reference time information) of the base station and the time information of the receiving unit 20 without use of the expensive VCXO. Then, the receiving unit side reference clock of the receiving unit 20 is synchronized with the base station side reference clock through the minute adjustment (the receiving unit 20 can reproduce information of picture and sound from various data sent from the base station at a proper timing).

Therefore, the variable division can be carried out with only a digital circuit without use of the VCXO and consequently, the expensive VCXO and analog circuit components (including the external component of the decoder LSI 21 and the number of pins) can be reduced. Thus, cost of the receiving unit 20 as well as related boards can be reduced. Further, because the analog circuit is not used, fault ratio can be improved. Additionally, because the size of the receiving unit 20 can be reduced, prevalence of digital broadcasting is accelerated.

In the meantime, if the multiplier 23 is constituted of the PLL circuit, an analog circuit is contained in part thereof. However, usually at least one PLL circuit is contained in the decoder LSI 21. Thus, the effects of reduction of the above-mentioned components and miniaturization of the receiving unit 20 are not influenced. Detailed description of the PLL circuit is omitted because it is a well known technology.

The effects of the external component of the decoder LSI 21 and the reduction of the pins become particularly remarkable when the demodulator 4 is incorporated in the decoder LSI 21.

The division ratio control portion 25 fetches in an output of the phase comparator 13 and outputs the quantity of control by increasing/decreasing a standard value (32768 in the above example) proportional to the magnitude of phase error. As for the direction of increasing/decreasing, if the frequency of the receiving unit side reference clock is faster than the frequency of the base station side reference clock, the division ratio is increased (the clock is retarded) and if the frequency of the receiving unit side reference clock is slower than the frequency of the base station side reference clock, the division ratio is decreased (the clock is accelerated) (negative feedback).

Compared with positive feedback of controlling the direction of increase/decrease so that if the frequency of the receiving unit side reference clock is faster than the frequency of the base station side reference clock, decreasing the division ratio (the clock is accelerated), and if the frequency of the receiving unit side reference clock is slower than the frequency of the base station side reference clock, increasing the division ratio (the clock is retarded), a more stabilized circuit system can be constituted.

This embodiment has mentioned a case of adopting 25 MHz as a fixed frequency of a clock which is oscillated from the crystal oscillator 22 and is inputted to the demodulator 4. However, the fixed frequency is not limited to 25 MHz but other value may be adopted. However, it is preferable that the fixed frequency is not an integral multiple (including one multiple) of the frequency of the base station side reference clock.

For example, if the frequency of the base station side reference clock is 27 MHz, it is preferable that the fixed frequency of a clock oscillated from the crystal oscillator 22 is not 27 MHz or an integral multiple of 27 MHz.

The reason is that the divider 35 changes the division ratio for a very rare occasion in order to adjust the frequency very minutely so that disturbance of a low frequency is generated. The disturbance of low frequency bitter) cannot be removed by any low-pass filter or the like.

For example, assume a case of if the base station side reference clock is 27 MHz, using the crystal oscillator 22 which oscillates a clock of fixed frequency of 27 MHz so as to generate a clock of 1.296 GHz which is a result of multiplying it by 48 by means of the multiplier 23 and then dividing this with the variable digital dividing circuit 24 so as to generate a clock of 216 MHz.

If adjustment of ±1 PPM is carried out, the division ratio is 6±1/1000000 with respect to the clock of 1.296 GHz. Therefore, not only the division ratio needs to be changed to 5 or 7 but also necessity of adjustment of the division ratio which is once per million times occurs for the clock of 216 MHz. This causes jitter of low frequency of 216 Hz.

On the other hand, if the clock of 25 MHz is used as the fixed frequency, the division ratio of the clock of 216 MHz with respect to the clock of 1.3 GHz turns to 6+(1/54), so that jitter occurs once per 54 clocks of 216 MHz. This leads to generation of jitter of high frequency of 4 MHz, which can be removed easily from audio signal or video signal by means of the low-pass filter.

By constructing the variable digital dividing circuit 24 as shown in FIG. 2, the dividing circuit capable of changing the division ratio can be established with such a simple digital circuit structure.

Second Embodiment

Figure 4:
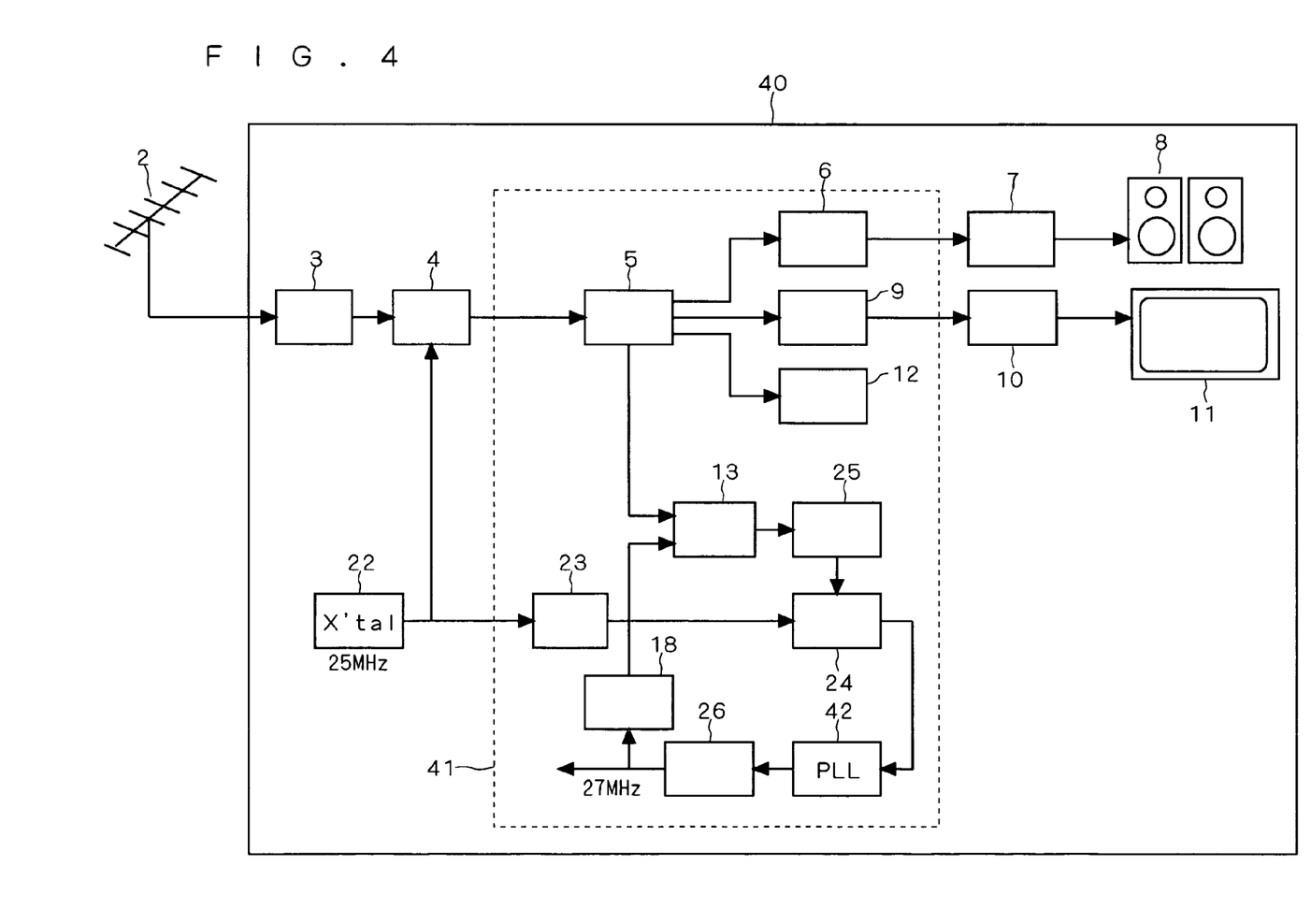
FIG. 4 is a block diagram showing a structure of the digital broadcasting receiving unit according to a second embodiment.

FIG. 4 is a block diagram showing the structure of a digital broadcasting receiving unit (hereinafter referred to as receiving unit) 40 according to this embodiment. The receiving unit 40 of this embodiment is different from the receiving unit 20 of the first embodiment in following points.

If paying attention to the structures of the decoder LSI 21 in FIG. 1 and a decoder LSI 41 in FIG. 4, according to this embodiment, a PLL circuit 42 is inserted in between the variable digital dividing circuit 24 and the dividing circuit 26. The other structure is the same between both the receiving units 20 and 40.

The PLL circuit 42 outputs a clock (having a synchronous frequency) synchronous with a clock outputted from the variable digital dividing circuit (which can be grasped as variable digital dividing portion) 24. Then, the clock having the synchronous frequency is inputted to the reference counter (which can be grasped as time information generating portion) 18 through the dividing circuit 26.

The PLL circuit 42 is constituted of a low-pass filter, VCO (voltage controlled oscillator). In the meantime, the PLL circuit 42 is a well known circuit and thus, detailed description thereof is omitted here.

The PLL circuit 42 fetches in, for example, a clock of 216 MHz, controls the incorporated VCO and outputs an oscillation clock of 216 MHz having a frequency ratio of 1:1.

The clock outputted from the PLL circuit 42 is synchronous with the input clock as described above. Further, the frequency ratio is not limited to 1:1 but a frequency of any multiple number of the receiving unit side reference clock (which changes minutely) necessary for the receiving unit 40 may be selected. However, the frequency ratio is set to 1:1 to understand a difference from the first embodiment easily for convenience of description.

It is permissible to generate an output clock of 27 MHz from an input clock of 216 MHz by integrating the dividing circuit 26 on a subsequent stage with the PLL circuit 42 to obtain a frequency ratio of 8:1. Conversely, clocks of 432 MHz or 864 MHz can be generated from an input clock of 216 MHz.

As described above, the receiving unit 40 of this embodiment includes the PLL circuit 42. Therefore, even if a low frequency jitter occurs as a result of changes of the division ratio in the variable digital dividing circuit 24, that jitter can be removed by the PLL circuit 42 and further, an output clock synchronous with the input clock can be sent.

For example, the PLL circuit 42 is changed over to a different clock (for example, having the same oscillation frequency) synchronous with the 216 MHz clock outputted from the variable digital dividing circuit 24. Therefore, 0.77 nano second jitter which is generated discretely and contained in 216 MHz clock outputted from the variable digital dividing circuit 24 is dispersed, so that smoother 216 MHz clock is outputted from the PLL circuit 42. As a consequence, the discrete jitter of the receiving unit side reference clock of 27 MHz supplied to the receiving unit 40 is reduced thereby reducing noise applied to video signal and audio signal.

Third Embodiment

Figure 5:
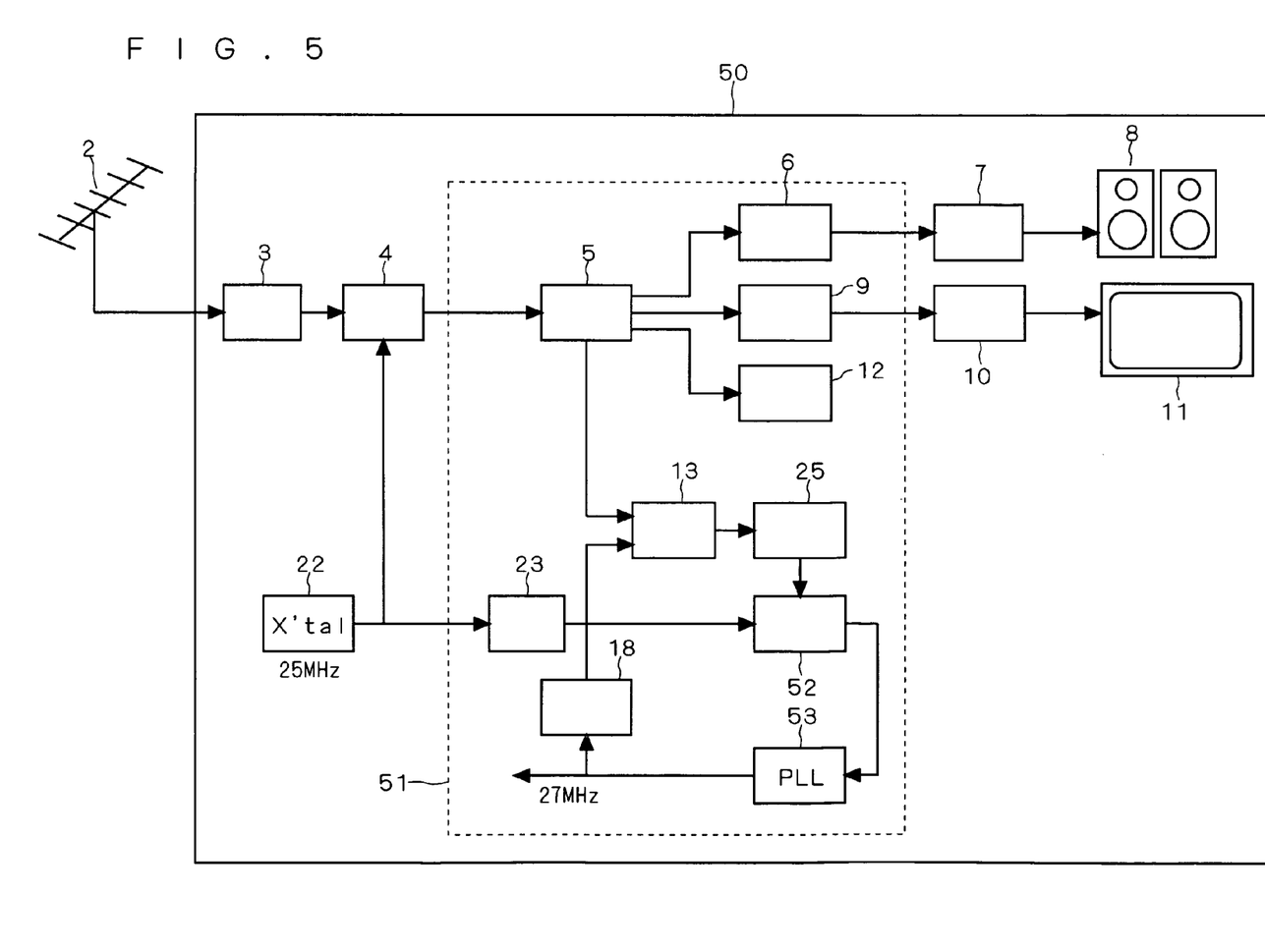
FIG. 5 is a block diagram showing a structure of the digital broadcasting receiving unit according to a third embodiment.

FIG. 5 is a block diagram showing the structure of a digital broadcasting receiving unit (hereinafter referred to as receiving unit) 50 of this embodiment. The receiving unit 20 of the first embodiment is different from the receiving unit 50 of this embodiment in following points.

Attention is paid to the structures of the decoder LSI 21 in FIG. 1 and a decoder LSI 51 in FIG. 4. First, the variable digital dividing circuit 24 and a variable digital dividing circuit 52 are different from each other in their internal structure. In the meantime, the internal structure of the variable digital dividing circuit 52 will be described with reference to FIG. 6.

In the first embodiment, the dividing circuit 26 is disposed between the variable digital dividing circuit 24 and the reference counter (which can be grasped as time information generating portion) 18. Contrary to this, according to this embodiment, a PLL circuit 53 is disposed between the variable digital dividing circuit 52 and the reference counter (which can be grasped as time information generating portion) 18 (in this embodiment, no dividing circuit 26 is disposed). In the meantime, description of the PLL circuit 53 is omitted because it is the same as description of the PLL circuit 42.

The other structure is the same between both the receiving units 20 and 50.

Figure 6:
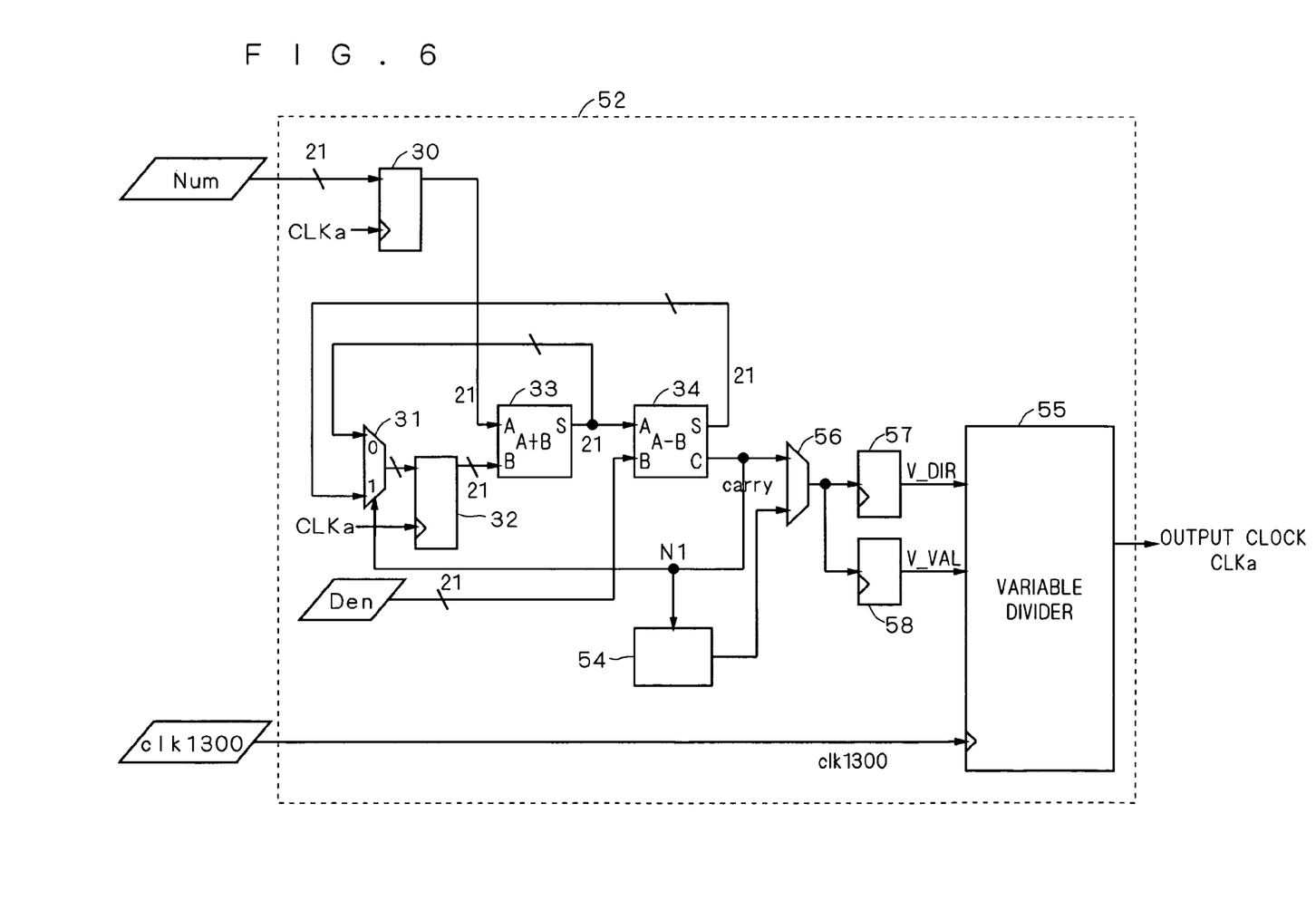
FIG. 6 is a block diagram showing a schematic internal structure of the variable digital dividing circuit according to the third embodiment.

Next, the structure and operation of the variable digital dividing circuit 52 of this embodiment will be described. FIG. 6 shows a schematic internal structure of the variable digital dividing circuit 52 of this embodiment.

In this embodiment, a case where the variable digital dividing circuit 52 divides an inputted clock of 1.3 GHz (expressed as clk1300 in FIGS. 6, 7) and generates/outputs a clock of 27 MHz. The division ratio in this case is 49+Num value/Den value. If the accuracy of the internal processing is set to binary 21 digits, the Num value is 262144 and the Den value is 1769472.

The variable digital dividing circuit 52 generates a disturbance with a random number and superimposes a jitter on the outputted clock of 27 MHz.

FIG. 6 shows a schematic internal structure of the variable digital dividing circuit 52, which is different from the variable digital dividing circuit 24 shown in FIG. 2.

In the variable digital dividing circuit 52 of this embodiment, as shown in FIG. 6, a random number generating unit (which can be grasped as a disturbance generating unit) 54 is connected at a connecting point N1 located between the "C" output portion of the subtractor 34 and the selector 31.

Further, a selector 56 and registers 57, 58 are connected between the "C" output portion of the subtractor 34 and the variable divider (hereinafter referred to as divider) 55.

In the meantime, an input portion of the selector 56 is connected to the "C" output portion of the subtractor 34 and the other input portion of the selector 56 is connected to the output portion of the random number generating unit 54. The output portion of the selector 56 is connected to the input portions of the registers 57, 58 in parallel and the respective output portions of the registers 57, 58 are connected to the input portion of the divider 55.

Next, the schematic operation of the respective circuits 54 to 58 will be described.

In FIG. 6, the random number generating unit 54 generates a disturbance in a specified range (clock cycle of 1.3 GHz, for example, ±4 cycles). The selector 56 can switch an output signal from the "C" output portion of the subtractor 34 and an output signal from the random number generating unit 54.

If the carry signal from the subtractor 34 is "1" signal, the random number generating unit 54 interrupts generation of the random number (accurately speaking, delaying by a cycle of 27 MHz clock) and the selector 56 selects an output of the subtractor 34 with preference.

The register 57 extracts a polarity signal (V_DIR) indicating whether the cycle of the divider 55 is increased or decreased from the output of the selector 56 and outputs to the divider 55. Further, register 58 extracts a signal (V_VAL) indicating a deflection width of the cycle of the divider 55 from the output of the selector 56 and outputs it. Usually, the divider 55 divides the input clock of 1.3 GHz by 48 and outputs a clock of about 27 MHz.

In the structure of FIG. 6, the operation of the same circuit as in FIG. 2 is the same as the first embodiment. However, this embodiment is different in that the Num value and Den value are different from the values described in the first embodiment and the output clock CLKa is 27 MHz.

However, if activity of the random number generating unit 54 is neglected, in this case, a clock of 27 MHz is generated accurately from the clock of 1.3 GHz. As for the disturbance, its DC value is 0 when time average is obtained so that the frequency of the output is not changed due to the disturbance. Only frequency jitter is generated.

Figure 7:
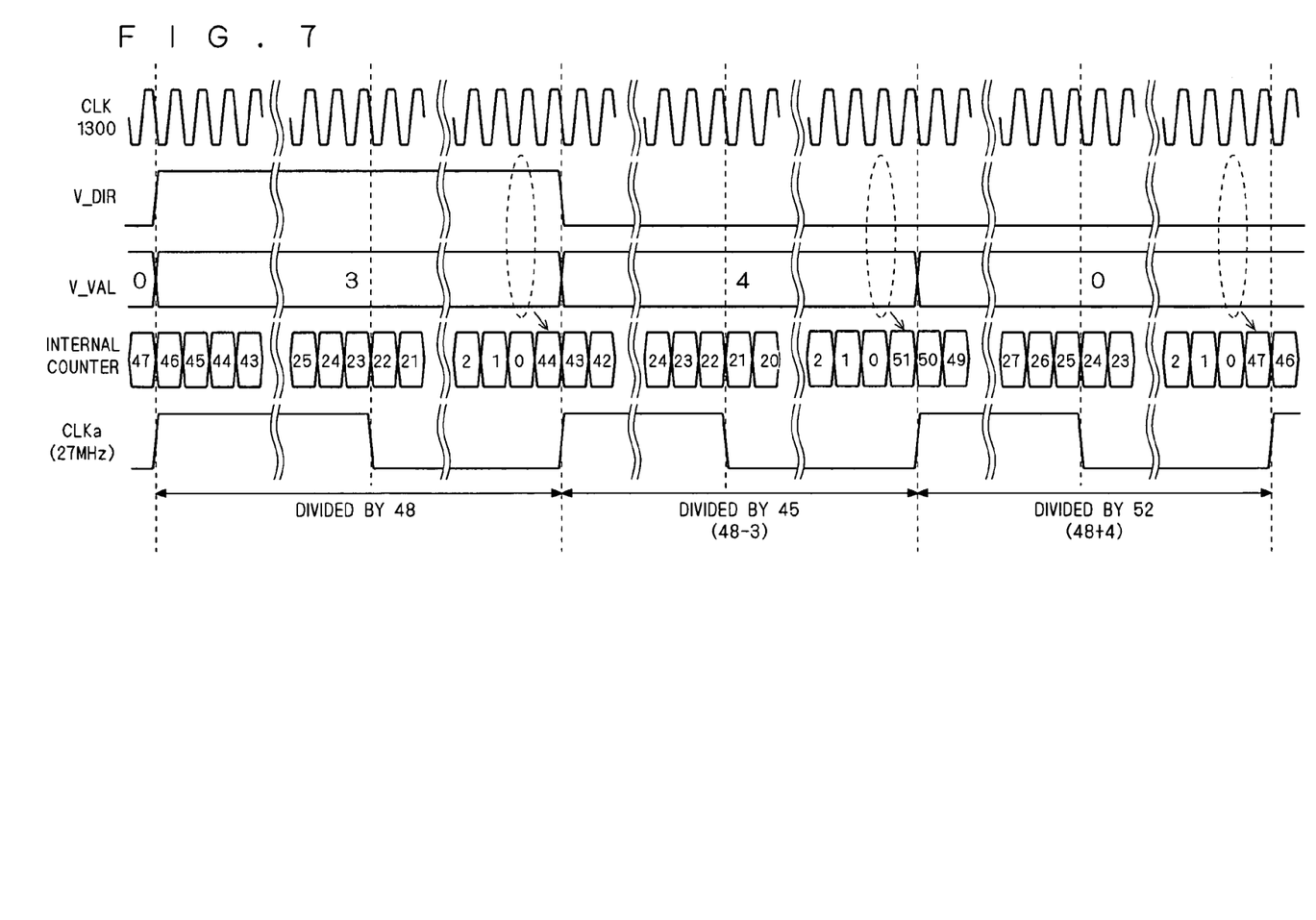
FIG. 7 is a timing chart for explaining an operation of the variable digital division in the third embodiment.

FIG. 7 is a timing chart showing the operation of the variable digital dividing circuit 52 (or divider 55). More specifically, FIG. 7 is a timing chart showing a state in which a clock of 1.3 GHz is divided by the divider 55 so as to generate an output clock CLKa of 27 MHz.

FIG. 7 shows a clock signal of 1.3 GHz inputted from the multiplier 23, a V_DIR signal outputted from the register 57, 27 MHz signal outputted from the register 58 and output clock CLKa (27 MHz) outputted from the divider 55, successively from the top.

If output from the register 58 is "0", the divider 55 divides the input clock of 1.3 GHz by 48 and outputs output clock CLKa of about 27 MHz. (a first cycle of the output clock CLKa in FIG. 7 corresponds to this.)

While the divider 55 divides by 48, V_DIR and V_VAL change, so that an instruction of decreasing the count value by "3" from "48" is inputted. Therefore, in a next cycle, the divider 55 divides the input clock of 1.3 GHz by 45 and outputs output clock CLKa of about 27 MHz (corresponds to a second output cycle of the output clock CLKa in FIG. 7).

While the divider 55 divides by 45, V_DIR and V_VAL change so that an instruction of increasing the count value by "4" from "48" is inputted. Thus, in a next cycle, the divider 55 divides the input clock of 1.3 GHz by 52 and outputs the output clock CLKa of about 27 MHz (corresponds to a third output cycle of the output clock CLKa in FIG. 7).

As described above, the count value is changed by a signal from the random number generating unit 54. That is, the random number generating unit 54 generates a disturbance in the output clock CLKa. In the meantime, the magnitude of the disturbance is determined by setting of the random number generating unit 54.

The frequency of the output clock CLKa in a predetermined period is turned to 27 MHz by the above-described sequential disturbance generating processing.

The output of the variable digital dividing circuit 52 is inputted to the PLL circuit 53 on a subsequent stage so as to control the incorporated VCO producing a clock of 27 MHz having a frequency ratio of 1:1 and then, the generated clock is used as the reference clock (receiving unit side reference clock) of the decoder LSI 51 and at the same time inputted to the reference counter 18. The frequency ratio of the PLL circuit 53 can be selected arbitrarily.

By providing with the PLL circuit 53, the receiving unit side reference clock is converted to a clock which has no discrete jitter but dispersed jitter although the frequency is the same. Thus, noise having a particular cycle is reduced thereby improving the quality of audio signal and video signal.

In conclusion, the variable digital dividing circuit 52 makes clocks divided according to a predetermined division ratio to generate disturbance in the random number generating unit 54, so that the frequency component of jitter is dispersed. Consequently, unless the aforementioned disturbance by the random number generating unit 54 exists, jitter generated by low frequency wave can be generated as jitter of high frequency wave. Then, the jitter of the high frequency wave is removed by the low-pass filter in the PLL circuit 53 and the PLL circuit 53 outputs the clock from which the jitter is removed as the reference clock.

The division ratio of the variable digital dividing circuit 52 does not always need to be a value indicated in this embodiment. For example, the Num value=38836 and the Den value=262144 can obtain the same effect. In this case, a deflection of 0.0000038 occurs. However, the entire feedback system of the receiving unit 50 is synchronous with the reference time information of the base station (base station side reference clock) and finally, this deflection is compensated.

If the Num value of 38836 and the Den value of 262144 are used, the clock can be adjusted at the same ratio as the reference clock of audio sampling frequency generated from 27 MHz, so that deflection between the receiving unit side reference clock of the entire receiving unit 50 and the audio clock can be prevented, which is preferable.

The invention described in the above embodiments can be applied to a digital broadcasting receiving unit for home use (for example, set top box (STB) unit and digital TV unit incorporating digital broadcasting function) and digital broadcasting system having the same. Additionally, the present invention can be applied to a digital broadcasting application unit such as TV broadcasting recording unit (so called recorder) incorporating the digital broadcasting receiving function.

While the invention has been shown and described in detail, the foregoing description is in all aspects illustrative and not restrictive. It is therefore understood that numerous modifications and variations can be devised without departing from the scope of the invention.

What is claimed is:

1. A digital broadcasting receiving unit for receiving digital broadcasting sent from a base station, comprising:
a fixed frequency oscillating portion for oscillating a clock of a predetermined fixed frequency, wherein said predetermined fixed frequency of said clock is adaptively varied for an operation of a demodulation portion;
a multiplier portion for multiplying a frequency of said clock of said predetermined fixed frequency and outputting the frequency of said clock after multiplication;
a variable digital dividing portion for dividing digitally the frequency of said clock after multiplication from said multiplier portion by a division ratio so as to change said division ratio;
a reference time information detecting portion for detecting reference time information which is sent from said base station and is information concerning base station side reference clock which serves as a criterion in said base station;
a time information generating portion for generating time information which is information concerning receiving unit side reference clock which serves as a criterion in said digital broadcasting receiving unit;
a difference detecting portion for detecting a difference between the frequency of said base station side reference clock and the frequency of said receiving unit side reference clock from said reference time information and said time information; and
a division ratio control portion for controlling change of said division ratio based on said difference, wherein
said time information generating portion generates said time information based on a clock having a frequency divided digitally by said variable digital dividing portion and feeds back said time information to said difference detecting portion.

2. The digital broadcasting receiving unit according to claim 1 wherein said division ratio control portion controls change of said division ratio so that the frequency of the clock outputted from said variable digital dividing portion is decreased when the frequency of said receiving unit side reference clock is larger than the frequency of said base station side reference clock, and controls the change of said division ratio so that the frequency of the clock outputted from said variable digital dividing portion is increased when the frequency of said receiving unit side reference clock is smaller than the frequency of said base station side reference clock.

3. The digital broadcasting receiving unit according to claim 1 wherein said variable digital dividing portion includes:

an adder for summing a variable first number sent from said division ratio control portion and second number;

a subtractor which executes subtraction on an addition result of said adder and a fixed third number;

a divider which divides by a predetermined positive number when said addition result is not larger than the third number, and divides with a number obtained by changing said predetermined positive number by an amount corresponding to the integer when said addition result is larger than the third number; and a register which holds said addition result as said second number when said addition result is not larger than said third number, and holds the subtraction result of said subtractor as said second number when said addition result is larger than said third number.

4. The digital broadcasting receiving unit according to claim 1 wherein said predetermined fixed frequency is not an integral multiple of the frequency of said base station side reference clock.

5. The digital broadcasting receiving unit according to claim 1 further comprising a PLL circuit which outputs a clock having synchronizing frequency synchronous with the output clock from said variable digital dividing portion and inputs the clock having said synchronization frequency into said time information generating portion.

6. A digital broadcasting system comprising:

a base station which sends digital broadcasting; and a digital broadcasting receiving unit for receiving the digital broadcasting sent from the base station, wherein said digital broadcasting receiving unit includes:

a fixed frequency oscillating portion for oscillating a clock of a predetermined fixed frequency, wherein said predetermined fixed frequency of said clock is adaptively varied for an operation of a demodulation portion;

a multiplier portion for multiplying a frequency of said clock of said predetermined fixed frequency and outputting the frequency of said clock after multiplication;

a variable digital dividing portion for dividing digitally the frequency of said clock after multiplication from said multiplier portion by a division ratio so as to change said division ratio;

a reference time information detecting portion for detecting reference time information which is sent from said base station and is information concerning base station side reference clock which serves as a criterion in said base station;

a time information generating portion for generating time information which is information concerning receiving unit side reference clock which serves as a criterion in said digital broadcasting receiving unit in order to generate time information;

a difference detecting portion for detecting a difference between the frequency of said base station side reference clock and the frequency of said receiving unit side reference clock from said reference time information and said time information; and a division ratio control portion for controlling change of said division ratio based on said difference, and said time information generating portion generates said time information based on a clock having a frequency divided digitally by said variable digital dividing portion and feeds back said time information to said difference detecting portion.

\* \* \* \* \*